(12) United States Patent
Maturana et al.

(10) Patent No.: US 10,348,581 B2
(45) Date of Patent: Jul. 9, 2019

(54) INDUSTRIAL MONITORING USING CLOUD COMPUTING

(71) Applicant: ROCKWELL AUTOMATION TECHNOLOGIES, INC., Mayfield Heights, OH (US)

(72) Inventors: Francisco Maturana, Lyndhurt, OH (US); Juan L. Asenjo, Timberlake, OH (US); Neethu Philip, Cleveland, OH (US); Shweta Chatrola, Mayfield Heights, OH (US)

(73) Assignee: Rockwell Automation Technologies, Inc., Mayfield Heights, OH (US)

(*) Notice: Subject to any disclaimer, the term of this patent is extended or adjusted under 35 U.S.C. 154(b) by 693 days.

(21) Appl. No.: 14/525,532

(22) Filed: Oct. 28, 2014

(65) Prior Publication Data

US 2015/0134733 A1    May 14, 2015

Related U.S. Application Data

(60) Provisional application No. 61/901,978, filed on Nov. 8, 2013.

(51) Int. Cl.
*H04L 12/26* (2006.01)
*H04L 29/08* (2006.01)
*G05B 19/418* (2006.01)

(52) U.S. Cl.
CPC .......... *H04L 43/04* (2013.01); *G05B 19/4185* (2013.01); *H04L 67/1002* (2013.01);
(Continued)

(58) Field of Classification Search
CPC ..... H04L 43/04; H04L 67/10; H04L 67/1097; H04L 67/2823; H04L 67/2842;
(Continued)

(56) References Cited

U.S. PATENT DOCUMENTS

2006/0190095 A1    8/2006  Nakahara et al.
2007/0075833 A1*   4/2007  Hunt ...................... G06Q 10/08
                                                          340/10.1
(Continued)

FOREIGN PATENT DOCUMENTS

EP           2728428 A1     5/2014
WO        2004027531 A1     4/2004
WO       20130036897 A1     3/2013

*Primary Examiner* — Backhean Tiv
*Assistant Examiner* — Mehulkumar J Shah

(57) ABSTRACT

Systems, methods, and software to facilitate cloud-based data processing and analysis in an industrial automation environment are disclosed herein. In at least one implementation, operational data generated by at least one industrial machine is stored in a local cache. The operational data is transferred for storage in an unstructured data storage system in a cloud-based architecture. In the cloud-based architecture, the operational data is processed to convert the operational data to a structured format and the operational data in the structured format is then stored in a structured data storage system. In response to receiving a request for analytics, at least a portion of the operational data is extracted from the structured data storage system and the analytics are executed on the at least the portion of the operational data.

20 Claims, 15 Drawing Sheets

(52) U.S. Cl.
CPC .......... *H04L 67/1097* (2013.01); *H04L 67/12* (2013.01); *H04L 67/2823* (2013.01); *H04L 67/2842* (2013.01); *G05B 2219/31288* (2013.01)

(58) Field of Classification Search
CPC ......... H04L 67/12; H04L 12/26; H04L 29/08; H04L 67/1002; G06F 17/30; G06F 16/00; G05B 19/4185; G05B 2219/31288; G05B 19/418
USPC .................................. 709/203, 201; 715/744
See application file for complete search history.

(56) References Cited

U.S. PATENT DOCUMENTS

| | | | |
|---|---|---|---|
| 2007/0142936 A1* | 6/2007 | Denison | G05B 13/0275 700/29 |
| 2009/0248179 A1 | 10/2009 | Kasai et al. | |
| 2010/0256795 A1* | 10/2010 | McLaughlin | G05B 19/4183 700/110 |
| 2011/0213831 A1* | 9/2011 | Gentile | H04L 43/065 709/203 |
| 2013/0211870 A1 | 8/2013 | Lawson et al. | |
| 2014/0250153 A1* | 9/2014 | Nixon | G05B 15/02 707/812 |
| 2014/0365242 A1* | 12/2014 | Neff | G06Q 50/22 705/3 |

\* cited by examiner

| CUSTOMER ID | SITE ID | APPLICATION ID | COMPONENT ID | TIME STAMP | TAG NAME | TAG VALUE |
|---|---|---|---|---|---|---|
| 1011 | ST1 | A211 | C211_1 | 06/07/2013 04:05:21 PM | TEMPERATURE | 143.012 |
| 1023 | 841 | 841_1 | 841_1_1 | 05/21/2013 03:13:22 PM | VIBRATION | 78.91 |

FIGURE 4

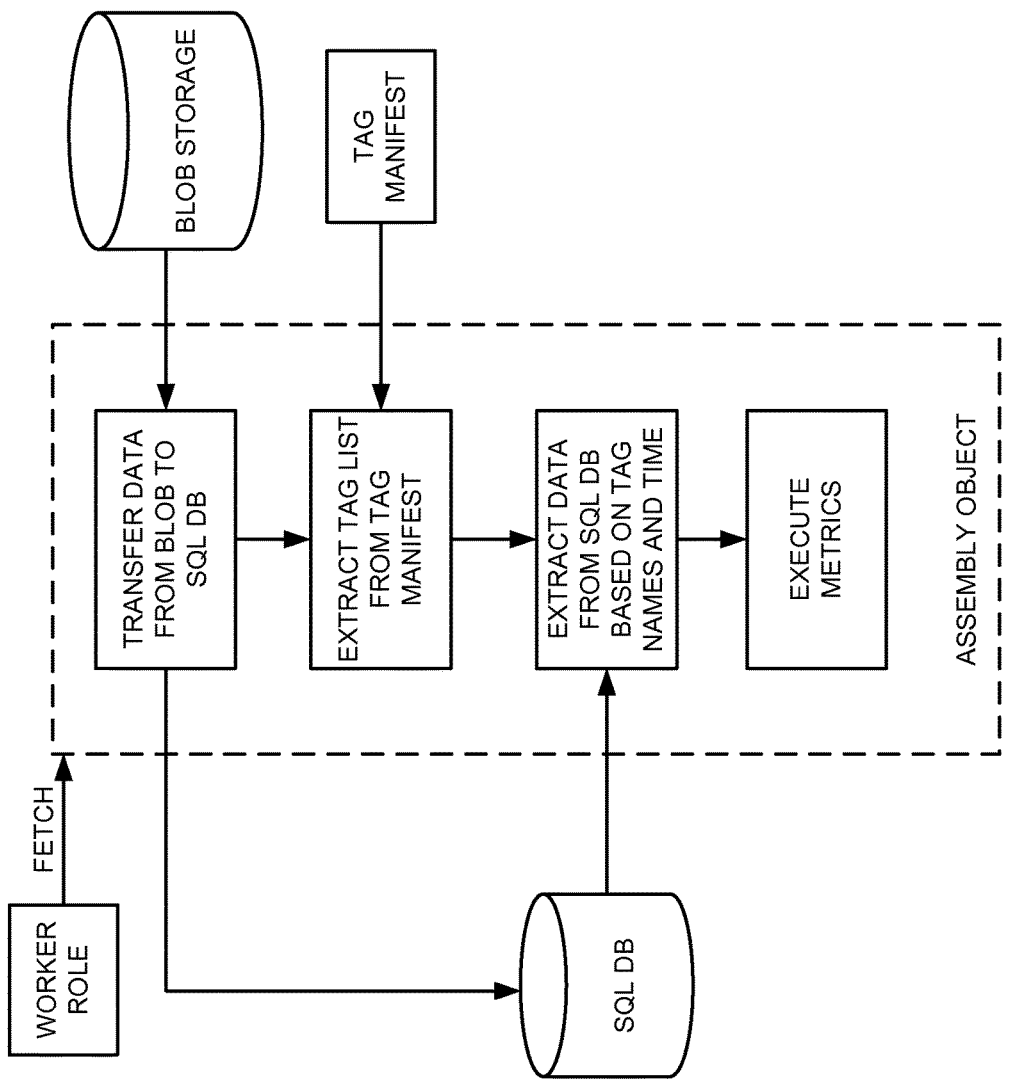

```
<Manifest xmlns:xsd="F:\Development\XML\XMLSchema"
xmlns:xsi="F:\Development\XML\XMLSchema">
<ReleaseDate>2012-05-30T17:16:07.6290869-05:00</ReleaseDate>
<MetricsManifest>F:\Development\ManifestMetricsManifest.xml</MetricsManifest>
<Customers>
  <CustomerName>Rockwell CMS</CustomerName>
  <CustomerID>1001</CusomterID>
  <Sites>
    <Site>
      <SiteID>101</SiteID>
      <SiteName>Rockwell Office</SiteName>
      <VSEs>
        <VSE>
          <VSEID>1</VSEID>
          <VSEName>Test Machine</VSEName>
          <VSETagManifest>F:\Development\ManifestTagManifest.xml</VSETagManifest>
          <MessageTypes>
            <MessageType>
              <MessageTypeName>Alarms</MessageTypeName>
              <MessageTypeID>0</MessageTypeID>
              <AssemblyInfo>
                <ProcessAssembly>
                  <ProcessID>100011</ProcessID>
                  <Namespace>CoreProcessAssembly.AlarmDataProcess</Namespace>
                  <AssemblyFileName>CoreProcessAssembly.dll</AssemblyFileName>
                </ProcessAssembly>
              </AssemblyInfo>
            </MessageType>
```

SYSTEM MANIFEST 700

FIGURE 7

```xml
<TagManifest ReleaseDate="2012-05-30T17:16:07.6290869-05:00">
<AnalyticsSystem>
 <ControlSystems>
  <ControlSystem ID="1">
   <Controllers>
    <Controller ID="1.0" Project="chassis1" connectedTo="N1" />
    <Controller ID="2.0" Project="modularPLC" connectedTo="N2" />
   </Controllers>
   <Networks>
    <Network ID="N1" Name="TestNetwork1" />
    <Network ID="N2" Name="TestNetwork2" />
   </Networks>
  </ControlSystem>
 </ControlSystems>
 <Applications>
  <Application ID="1.1" Name="TurboExpander1">
   <Processes>
    <Process ID="1" Name="NetPower" />
    <Process ID="2" Name="CycleEfficiency" />
    <Process ID="3" Name="PowerGuarantee" />
   </Processes>
  </Application>
 </Applications>
 <Tags>
  <Tag name="GEN_REAL_POWER" Units="MW" ownerProcessID="1,2,3" ownerControllerID="1.0" />
  <Tag name="OIL_OUTLET_FLOW" Units="m3/hr" ownerProcessID="2,3" ownerControllerID="1.0" />
  <Tag name="OIL_IN_TEMP" Units="C" ownerProcessID="2" ownerControllerID="2.0" />
 </Tags>
```

TAG MANIFEST 800

FIGURE 8

```xml
<MetricsManifest ReleaseDate="2012-05-30T17:16:07.6290869-05:00">
  <Metrics>
    <Metric ID="1" Name="NetPower">
      <coefficients>
        <coefficient Name="Cars/MWh/yr" Units="MWh/yr" Value="0.147" />
        <coefficient Name="Homes/MWh/yr" Units="MWh/yr" Value="0.0883" />
      </coefficients>
      <Thresholds>
        <Threshold Value="0.592" Units="TestUnit1" />
      </Thresholds>
    </Metric>
    <Metric ID="2" Name="CycleEfficiency">
      <coefficients>
        <coefficient Name="Therminol 59, Density(Temp [C])-A" Units="kg/m3" Value="-0.807" />
        <coefficient Name="Therminol 59, Density(Temp [C])-B" Units="kg/m3" Value="999.38" />
        <coefficient Name="Therminol 59, Enthalpy(Temp [C])-A" Units="kj/kg" Value="0.001694" />
        <coefficient Name="Therminol 59, Enthalpy(Temp [C])-B" Units="kj/kg" Value="1.599" />
        <coefficient Name="Therminol 59, Enthalpy(Temp [C])-C" Units="kj/kg" Value="29.28" />
      </coefficients>
      <Thresholds>
        <Threshold Value="1.823" Units="TestUnit2" />
      </Thresholds>
    </Metric>
  </Metrics>
</MetricsManifest>
```

METRICS MANIFEST 900

FIGURE 9

INDUSTRIAL MONITORING USING CLOUD COMPUTING

RELATED APPLICATIONS

This application claims the benefit of, and priority to, U.S. Provisional Patent Application No. 61/901,978, entitled "INDUSTRIAL MONITORING USING CLOUD COMPUTING", filed Nov. 8, 2013, and which is hereby incorporated by reference in its entirety for all purposes.

TECHNICAL BACKGROUND

Industrial controllers are crucial to the operation of modern automation systems. These controllers are typically used to drive machinery that perform tasks on an industrial floor, such as product manufacturing, material handling, batch processing, and supervisory control, amongst many other possible operations. To accomplish these tasks, controllers may include and execute a variety of programs and functions that aid the mechanical systems to produce the desired end product.

Due to the large number of system variables that must be considered by the controllers, it is essential that the controllers have the most up to date and accurate data about the industrial system. Further, operators of the various devices within the industrial system may require data to make appropriate changes to the controllers of these devices. As a result, various types of information, such as production statistics, data relating to machine health, alarm statuses, operator feedback, electrical or mechanical load over time, and the like are often monitored on a continuous basis.

Overview

Systems, methods, and software to facilitate cloud-based data processing and analysis in an industrial automation environment are disclosed herein. In at least one implementation, operational data generated by at least one industrial machine is stored in a local cache. The operational data is transferred for storage in an unstructured data storage system in a cloud-based architecture. In the cloud-based architecture, the operational data is processed to convert the operational data to a structured format and the operational data in the structured format is then stored in a structured data storage system. In response to receiving a request for analytics, at least a portion of the operational data is extracted from the structured data storage system and the analytics are executed on the at least the portion of the operational data.

This Overview is provided to introduce a selection of concepts in a simplified form that are further described below in the Technical Disclosure. It should be understood that this Overview is not intended to identify key features or essential features of the claimed subject matter, nor is it intended to be used to limit the scope of the claimed subject matter.

BRIEF DESCRIPTION OF THE DRAWINGS

Many aspects of the disclosure can be better understood with reference to the following drawings. While several implementations are described in connection with these drawings, the disclosure is not limited to the implementations disclosed herein. On the contrary, the intent is to cover all alternatives, modifications, and equivalents.

FIG. 4 illustrates an exemplary table for data collection.

FIG. 6 illustrates an exemplary assembly object and its behavior.

FIG. 7 illustrates an exemplary system level manifest.

FIG. 8 illustrates an exemplary tag manifest.

FIG. 9 illustrates an exemplary metrics manifest.

DETAILED DESCRIPTION

The following description and associated drawings teach the best mode of the invention. For the purpose of teaching inventive principles, some conventional aspects of the best mode may be simplified or omitted. The following claims specify the scope of the invention. Some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by claims and their equivalents.

Cloud computing has been implemented in various domains such as healthcare, education, transportation, logistics, smart grids, and the like. Cloud computing provides reliable and resourceful systems that can be implemented to satisfy a variety of needs for these industries and help maintain control of the various processes necessary to keep them functioning. In operation, storage and computing capacities are very important constraints in a system that can cause difficulties within a wide range of environments. In an energy example, thousands of interconnected power generation machines, including Turbo Expander machines, may need to interoperate under ad hoc conditions and power demand intermittence. The smart and micro grids are intermittent power systems, creating distribution layouts that change frequently and are highly susceptible to seasonal demand and climatic conditions. This scenario requires global access to data and information processing to ensure proper operation.

In industrial automation environments, such as automobile manufacturing factories, food processing plants, oil drilling operations, microprocessor fabrication facilities, and other types of industrial enterprises, machines and other equipment are typically employed to carry out business operations. For example, an industrial automation enterprise could employ machines comprising sensors, drives, pumps, filters, drills, motors, robots, mills, printers, carousels, fabrication machinery, or any other industrial automation equipment. Such machines continually produce data over time, and this operational data is typically stored for subsequent processing and analysis. The following examples discuss various techniques for storing, processing, and analyzing data using a cloud-based architecture.

Figure 1:
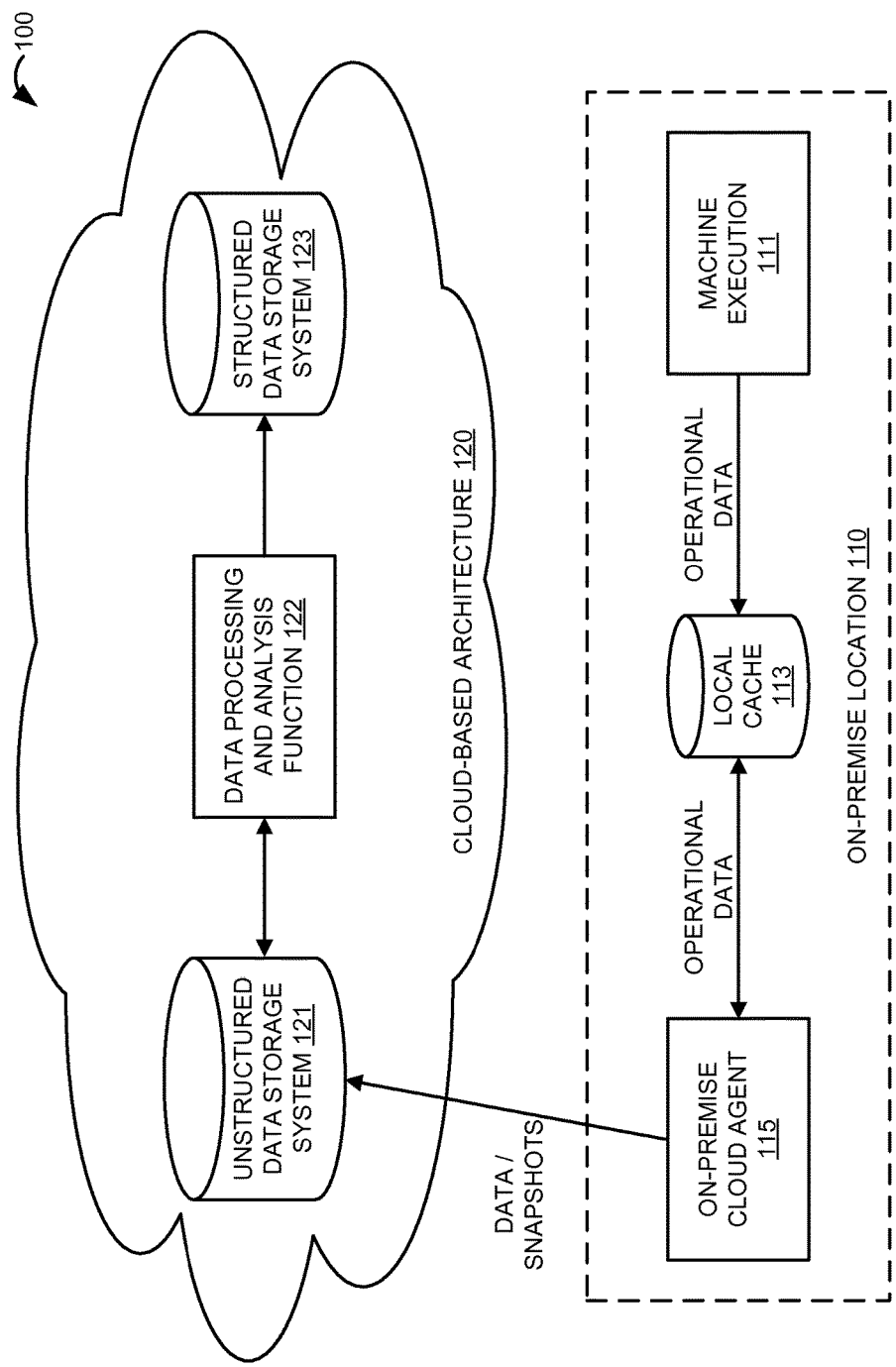
FIG. 1 illustrates a computing system that may be used to facilitate cloud-based data processing and analysis in an industrial automation environment.

FIG. 1 illustrates computing system 100 that may be used to facilitate cloud-based data processing and analysis in an industrial automation environment. In this implementation, computing system 100 includes an on-premise location 110 and a cloud-based architecture 120. On-premise location 110 could comprise any location where computing systems and machinery may be executed, but would typically comprise a factory floor, manufacturing facility, laboratory, research and development center, or some other kind of workspace. On-premise location 110 includes machine execution system 111, local cache 113, and on-premise cloud agent 115. Cloud-based architecture 120 includes unprocessed data storage system 121, data processing and analysis function 122, and processed data storage system 123. Computing system 100 is representative of any computing environment, which could include several different systems and devices located in geographically diverse areas and interconnected via communication networks in a distributed manner in some examples.

Machine execution system 111 could comprise a physical machine and its associated control system, which could comprise an industrial controller, automation controller, programmable logic controller (PLC), or any other controller used in automation control. In operation, machine execution system 111 is executed and provides operational data to the local cache data storage system 113. For example, machine execution system 111 could comprise a real physical system having a machine executing in the on-premise location 110 that produces real-time processes, such as temperature, flow, vibration, and the like, along with control data, such as proportional integral derivative (PID) signals, on/off signals, loop control signals, and the like. This data is periodically collected by the on-premise cloud agent 115 from the local cache 113 and fed into a big data repository in the cloud environment 120. A cloud-based big data repository is represented by the unstructured data storage system 121 in FIG. 1. In this manner, the on-premise cloud agent data collector 115 captures operational data from the machine execution system 111 via the local cache 113 and provides this data in the form of snapshots to the unstructured data storage system 121 in the cloud-based architecture 120. The data processing and analysis function 122 then works to process the operational data from the unstructured data storage system 121 for storage in a structured format in structured data storage system 123. Analytics on the data stored in structured data storage system 123 can then be performed when necessary. An operation of computing system 100 will now be described with respect to FIG. 2.

Figure 2:
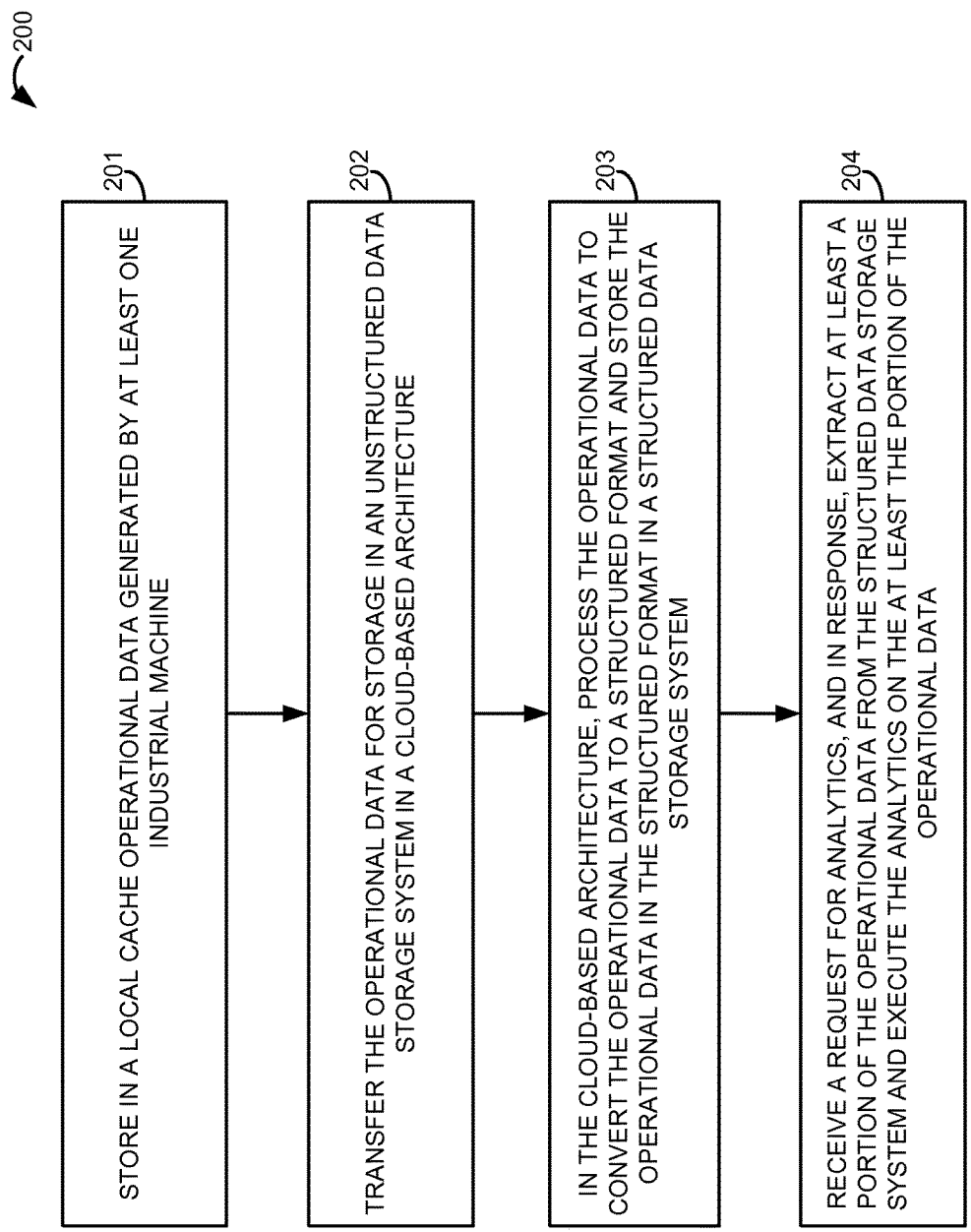
FIG. 2 illustrates an operation of a computing system in an exemplary implementation.

FIG. 2 is a flow diagram that illustrates an operation 200 of computing system 100 in an exemplary implementation. The operation 200 shown in FIG. 2 may also be referred to as analytics process 200 herein. The steps of operation 200 are indicated below parenthetically. The following discussion of simulation process 200 will proceed with reference to computing system 100 of FIG. 1 in order to illustrate its operations, but note that the details provided in FIG. 1 are merely exemplary and not intended to limit the scope of analytics process 200 to the specific implementation shown in FIG. 1.

Analytics process 200 may be employed to operate computing system 100 to facilitate cloud-based data processing and analysis in an industrial automation environment. As shown in the operational flow of analytics process 200, computing system 100 stores in local cache 113 operational data generated by at least one industrial machine (201). In some examples, the operational data generated by machine execution 111 is continuously output and stored in local cache 113. For example, the operational data could include the velocity, acceleration, articulation, and other data that describes the motion of the machine while operating. Further, the operational data could include pressures, temperatures, vibrations, flow rates, and any other data that may be collected during machine execution 111. In some examples the operational data could also include configuration data, parameters, time intervals, coefficients, thresholds, and other metrics used in the setup, control, and execution of an industrial machine. In at least one implementation, each piece of information in the operational data is described by individual data tags, where each tag is defined by a tag name and a tag value.

On-premise cloud agent 115 transfers the operational data for storage in unstructured data storage system 121 in cloud-based architecture 120 (202). Typically, on-premise cloud agent 115 retrieves the operational data from local cache 113 and pushes the operational data to the cloud-based architecture 120 for storage in unstructured data storage system 121. In at least one implementation, the on-premise cloud agent 115 periodically connects to the local cache 113 and collects chunks of time series data generated by machine execution 111, compresses this data, and transmits it for storage in the cloud 120. In some examples, on-premise cloud agent 115 assigns a priority to the operational data when transferring the data for storage in the unstructured data storage system 121. On-premise cloud agent 115 could assign a priority to the operational data, for example, by assigning a priority to respective data tags that contain the operational data. In some examples, on-premise cloud agent 115 could utilize various scripts and other processing instructions to determine the priorities to apply to the individual data tags on the operational data. Other techniques of assigning a priority to the operational data are possible and within the scope of this disclosure.

In the cloud-based architecture 120, data processing and analysis function 122 processes the operational data to convert the operational data to a structured format and stores the operational data in the structured format in structured data storage system 123 (203). For example, data processing and analysis function 122 could retrieve instructions to execute an initial data pre-processing activity comprising converting the unstructured operational data from unstructured data storage system 121 to structured data and storing the structured data in structured data storage system 123. In at least one implementation, when the data gets pushed to the cloud 120 by the on-premise cloud agent 115, a notification event message may be sent by agent 115 to a priority queue system in the cloud 120 to inform the data processing and analysis function 122 about the arrival of new data. Data processing and analysis function 122 would then receive the notification and initiate data processing on the operational data received in unstructured data storage system 121. In some examples, to process the operational data to convert the operational data to the structured format and store the operational data in the structured format in the structured data storage system 123, data processing and analysis function 122 may be configured to process the operational data based on a priority. Typically, the data processing and analysis function 122 would process higher priority data first.

Data processing and analysis function 122 receives a request for analytics, and in response, extracts at least a portion of the operational data from the structured data storage system 123 and executes the analytics on the at least the portion of the operational data (204). Typically, the request for analytics is received from on-premise cloud agent 115, although the request could be received from any other entity or network element in some examples. In at least one implementation, the request for analytics could include a priority, which would typically be assigned to the request by on-premise cloud agent 115 upon making the request. In this case, data processing and analysis function 122 could execute the analytics on at least a portion of the operational data by processing the request for the analytics based on the priority using a priority queue in the cloud-based architecture 120. Further, in order to execute the analytics, data processing and analysis function 122 could retrieve analytics processing instructions and analytics parameters based on information included in the request and/or information included in at least the portion of the operational data, in some examples. For example, the operational data could include individual data tags for each information item included in the data, and data processing and analysis function 122 could extract the relevant operational data from structured data storage system 123 based on the tag names and time stamps. Data processing and analysis function 122 would then execute the requested analytics on the extracted operational data, and could then provide the results back to the on-premise cloud agent 115. In some examples, the results of the analytics could be presented using various graphical displays and trend diagrams, enabling human operators to quickly observe the results while hiding the complexity of the calculations.

Advantageously, the techniques described herein provide a cloud-based solution for monitoring industrial processes and machine operations that occur at an on-premise location 110. The system can be widely used in any industry, particularly where sensor-based data is gathered from various sources and where trending calculations require access to large data stores. In this manner, the cloud-based architecture 120 can be leveraged to greatly simplify the tasks of collecting, distributing, storing, and processing industrial data.

Figure 3:
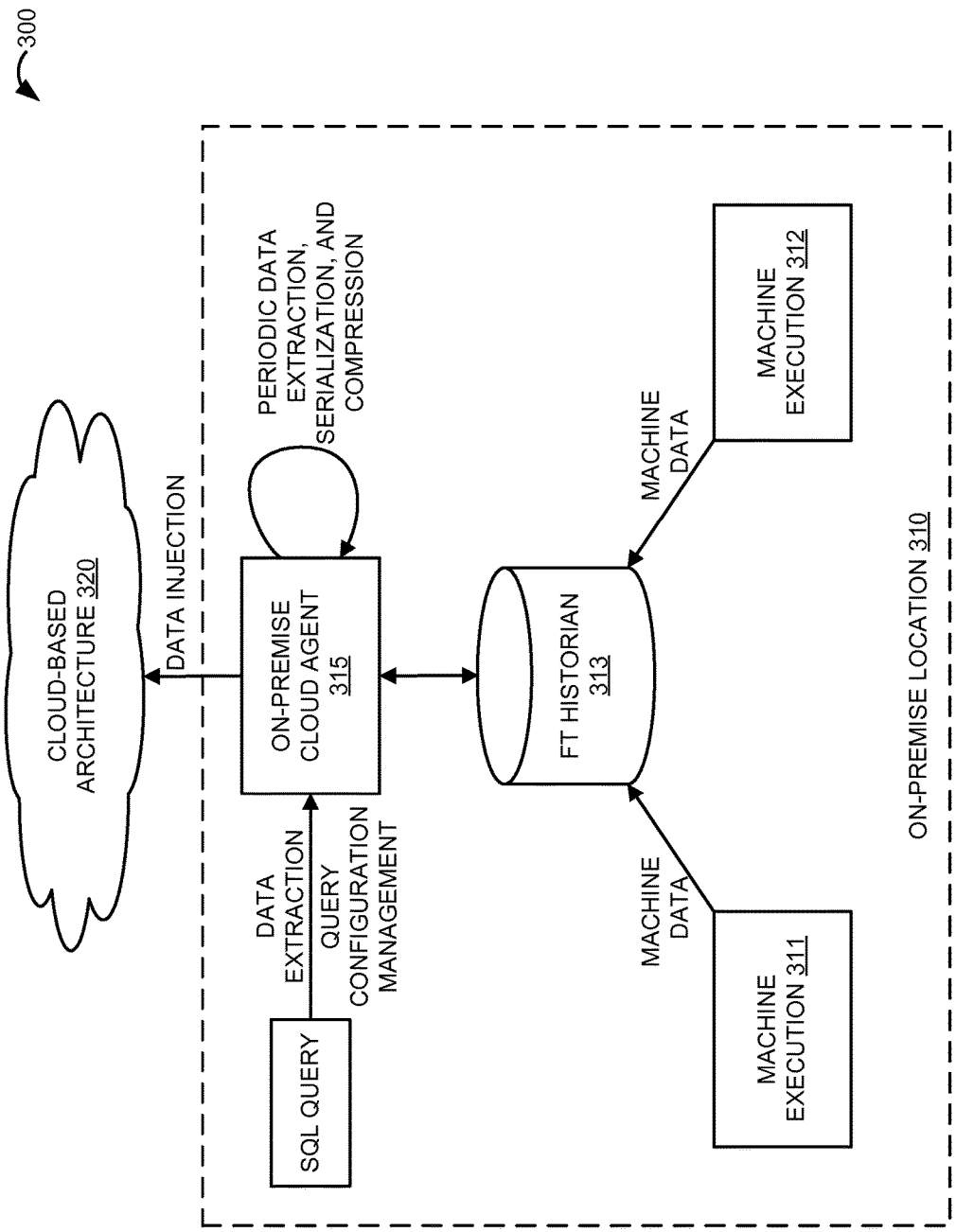
FIG. 3 illustrates an exemplary computing system for industrial monitoring.

Referring now to FIG. 3, an exemplary computing system 300 that may be used for industrial monitoring is shown. Computing system 300 includes on-premise location 310 and cloud-based architecture 320. FIG. 3 provides details of an exemplary on-premise architecture as shown in on-premise location 310, which may be located at one or more facilities of an industrial operation. The on-premise location 310 in this example includes machine execution systems 311 and 312, FT historian database 313, and on-premise cloud agent 315.

In an exemplary system architecture, each parameter of the system is called a tag. The value of a tag is associated with a time stamp to form time-series data. A collection of time-series data creates records, which are grouped, compressed, and moved to the cloud-level storage by the on-premise cloud agent 315. Each data source possesses system, data, and metrics configuration files that are named on-premise manifests. A worker role module in the cloud-based architecture 320 (not shown in FIG. 3) extracts a list of tags from a tag manifest to match the system parameters with a specific analytics action to run on them, obtained from a metrics manifest. Based on this combination of manifests, a dynamic data structure is established for extracting and processing the data that is being accumulated in the cloud. The following assumptions were made during the design of this architecture:

a) The manifests should be available in the cloud environment.

b) The format of all manifests should be fixed and strictly followed.

c) On-premise data should be moved to the big data repositories in the cloud with an assigned priority.

d) A tag manifest should contain a list of tags with an associated analytical hierarchy.

e) An analytical hierarchy should define which tags are used in specific equipment analysis calculations.

f) Constant parameters, thresholds, and other values to be used in the analytics calculations may be specified in a metrics manifest.

In the present example, a user can specify a time interval to perform specific calculations on the data, such as calculating power cycle efficiencies and thresholds for detecting anomalies. If no data is available for that time interval, an interpolation action is automatically triggered to estimate the missing values, which is based on existing data points around the missing points. Field level sensors collect on-premise machine data (i.e., tags) into data collector software called "FT Historian", which stores the data into a local cache, which are collectively shown as FT historian database 313 in this example.

There is an on-premise cloud agent 315 operating as a data concentrator on top of the FT Historian system 313. This cloud agent 315 provides data encapsulation and transmission, and periodically connects to the FT Historian 313 to collect chunks of time series data for compressing and transmitting to the cloud. The size of the chunks is configurable.

The cloud agent 315 verifies that the connection to the cloud is open and available before sending any data to the cloud-level receptacles. If a disruption occurs in between the cloud and the on premise connection, the cloud agent 315 changes its state into a data-caching mode until the connection is restored, and forwards the cached data to the cloud at that time.

Turning now to data gathering, state-of-the-art systems that manage data storage and analysis on-site suffer from issues such as finite data-storage capacity and single point of failure issues. These issues are not easily handled with current technology because of the high maintenance requirements and cost that localized database systems introduce into information technology operations. Although these issues can be overcome with a big budget, personnel, and time, the system described herein uses a lower-cost cloud computing solution. Cloud computing beneficially provides a more flexible, naturally scalable infrastructure for big data blob storage.

In the present example, the cloud 315 agent is fully configurable using a Structured Query Language (SQL) module where the system designer can define the rules for extracting and processing the machine data. In some cases, the cloud agent 315 may utilize multiple SQL scripts to process the various pieces of data. The scripts are a form of on-premise analytics that help to detect anomalies as data is being generated and streamed to the cloud. The cloud agent 315 can also leverage the SQL scripts to ensure that data being pushed into the cloud is provided in a serialized and compressed form. An exemplary format of the data structure is shown in the table of FIG. 4.

Figure 5:
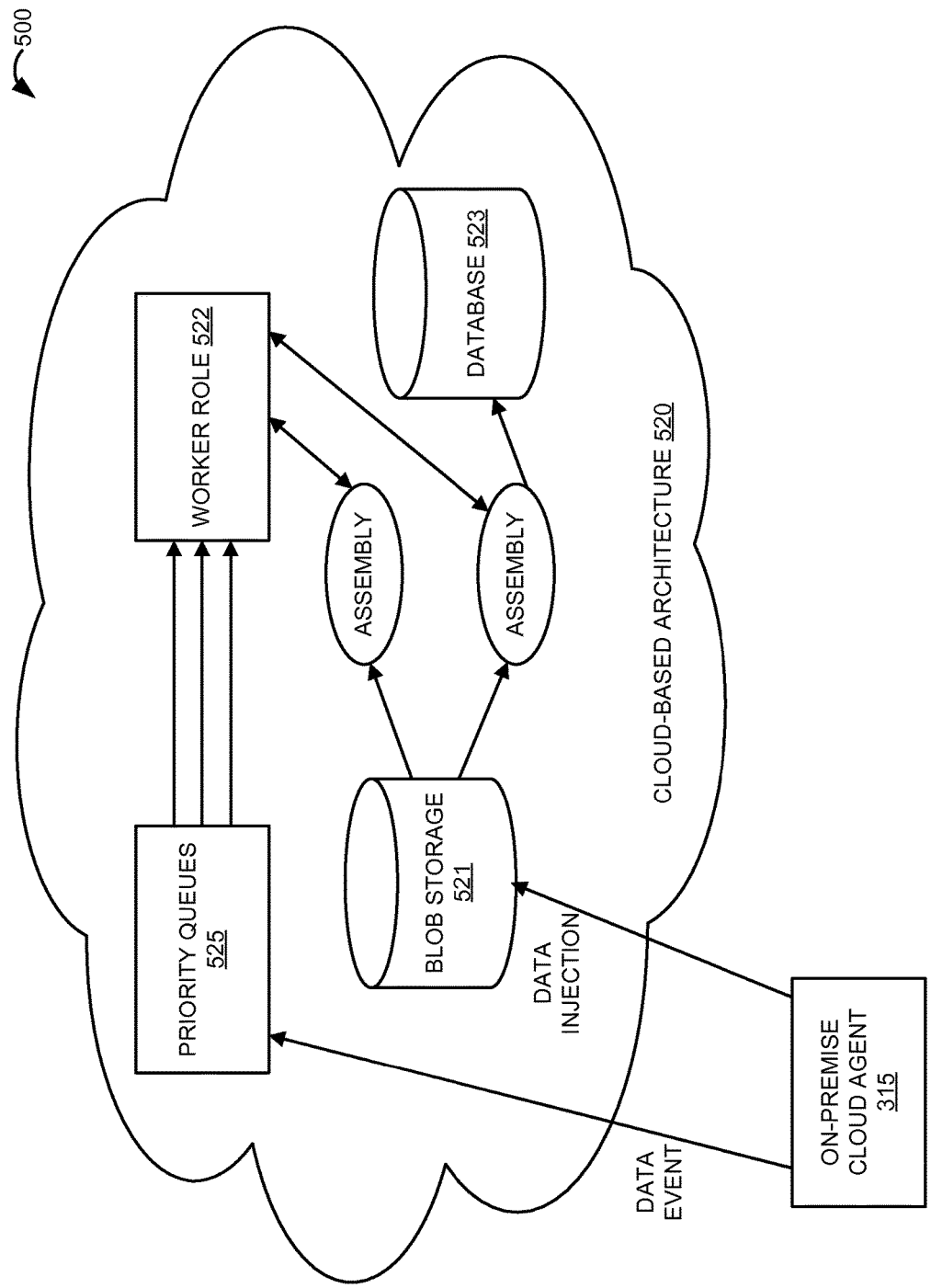
FIG. 5 illustrates an exemplary cloud-based solution for industrial monitoring.

Once the cloud agent 315 transfers the data, the data is then sent to the cloud infrastructure 320 that may be implemented using Microsoft® Azure™ Google® Cloud Platform, Amazon® Web Services, or any other cloud-based architecture. A cloud-based architecture 320 provides the foundation for solving big data storage and analytics. Cloud-based architecture 320 may be leveraged to include a worker role, web role, and virtual machines (VMs) to manage the multiple data sources coming from the different tenants in an integrated and compartmentalized manner. Here, the present example includes an SQL server, blobs, queues, and a service bus to enable the data analysis as Software-as-a-Service (SaaS). Further, the system incorporates Infrastructure-as-a-Service (IaaS) features, thereby leveraging servers within the cloud. Cloud-based architecture 520 as shown in FIG. 5 provides an exemplary architecture of how these various network elements and devices may be organized within the cloud. Once the cloud agent 315 pushes the data to the cloud, data arrives into blob storage 521. A corresponding acknowledgement from the blob storage 521 is sent to the cloud agent 315 to acknowledge completion of transmission. Next, a notification event message is sent to a priority queue system 525 by the cloud agent 315 to inform the worker role 522 about the arrival of the new data.

The worker role 522 as shown within cloud-base architecture 520 is configured to observe events, such as the arrival of new data into blob storage 521 as mentioned above, and to responsively initiate the data processing. The worker role 522 typically processes higher priority data first. The worker role 522 uses the event header information to identify system-level manifest information. This system-level manifest tells what procedure (i.e., assembly code) should be used to execute the data processing. The system-level manifest also conveys a tag-manifest reference. The worker role fetches the assembly to execute an initial data pre-processing activity which consists of moving unstructured data from the blob storage 521 to structured data in an SQL database, as shown in FIG. 6.

The transferring of the data requires that the assembly object be programmed with application-specific data conversion SQL scripts. In this system, there may be as many assembly objects as required by the data processing requirements. This condition is tenant specific and depends on the preferences of the designer on how to handle the data storage and metric flows. For example, another data flow may require capturing the data from blob storage 521 to transfer it to another cloud computing system for further processing.

Another important characteristic of this architecture is the ability to establish a generic model that is independent of the data. This concept is intended to liberate the dependency of the data model on hardcoded data indexing in the data processing procedures. This is a typical dependency problem that affects model scalability and reconfiguration, making the overall system inflexible to change.

In the proposed architecture, the data indexing is decoupled from the actual data processing procedure by moving it into a higher abstraction, defined by system, tag, and metrics manifests. This technique allows for very minimal application-specific hard code into the procedures. The challenge is to provide analytical and monitoring capabilities in the cloud while avoiding redeploying the cloud application every time there are new metrics to be added to the data processing system. This requirement is fundamental to avoid interrupting the service with model refreshing and periodic redeployment of the cloud application.

For example, in a time-series data analysis, the availability of data values for a specific point in time is very critical. In most cases, the desired value does not exist due to the high rate data acquisition variability of multi variable time-series sensor data. The missing values need to be interpolated from existing data. Hence, the interpolation procedure needs several pieces of information, such as the tag names of the data to be analyzed (which depends on the tenant properties), the point in time for which to retrieve sampled values, margins like minimum and maximum values, unit conversion factors, thresholds, and other similar data.

For each tenant type (i.e., equipment), it is necessary to specify an analysis sequence that will vary from tenant to tenant. Even in systems with tenants of the same type, different metrics are often used. To avoid making an unchangeable system (like in the classical model approach) where every aspect of the calculations is to be known at software coding time, the system described herein is more adaptable and configurable based on a declarative manifests technique.

As shown in FIG. 4, data being pushed into the cloud contains multiple tags and their values based on different time intervals. As a result, some tags change at a faster rate than others, so those tags are collected more frequently than others. The input data into the interpolation function will vary based on the type of data and the number of data tags to be processed. However, regardless of this complexity, the interpolator can be made generic enough to handle all interpolation cases using the same code but configured from the manifests, essentially eliminating the need for fixed data models.

Worker role 522 assists in modularizing the approach and leaves space for future enhancements and scalability with minor disruption on the baseline infrastructure. Every worker role 522 has a specific function to carry out, and also has the ability to communicate with other modules. Whenever the user requests analytics through a dashboard or an internal trigger, a worker role execution is triggered to carry out the calculations as directed by the manifests that represent the respective tenants.

In the present example, there are three types of manifests that are input into the system. These manifests include system manifests, tag manifests, and metrics manifests, which are written using an Extensible Markup Language (XML). An exemplary system manifest 700 is shown in FIG. 7. The system manifest contains an industrial organization's hierarchy information along with messages and their respective process assembly identifiers and versions. This main manifest contains links to tag and metrics manifests. The organization's hierarchy in the system manifest defines the site and data collectors (aka cloud agents), and there can be multiple sites per customer and each site can have multiple cloud agents. Further, each cloud agent can generate messages to be transmitted at various priorities.

In order to enhance the data collection techniques described above and to provide meaningful information about the devices and their hierarchy, the tag manifest is introduced. The tag manifest has control system contextual information by conveying owner-of-tag controller identification. The tag manifest also conveys tenant-level analytics sequences as application processes.

FIG. 8 provides an exemplary tag manifest 800. The tag manifest 800 identifies the specific tag names that are to be used to execute the data analysis, as shown in FIG. 8. The tag manifest 800 contains the analytics system hierarchy that is essentially divided into three main sections labeled control system, application, and tags. The control system identifies the control system information related to the container of the tags, each with one or more controllers and one or more networks. In this manner, the same assembly code can be used to process different tenants without having to impose a model structure on a per-tenant basis. The tag manifest 800 also conveys references to the metrics parameters (i.e., NetPower, CycleEfficiency) that are defined in metrics manifest 900 as shown in FIG. 9. These metrics parameters are needed by the assembly code during the calculations for these application processes. The references shown in tag manifest 800 to the "NetPower", "CycleEfficiency", and "PowerGuarantee" processes of the "TurboExpander1" application are references to generic procedures that are standard on a per-industry basis, such as the energy industry in this case. The assembly code uses a late binding style to connect to these procedures and bring in the referenced values from the metrics manifest 900. In this architecture, the application-level model is emergent and can be incrementally built.

As discussed above, FIG. 9 provides an exemplary metrics manifest 900. The metrics manifest 900 is a scalable structure that contains information related to constants and thresholds involved in the analytics calculations. Each analytics calculation involves some fixed constants along with the data tags. The constants in these calculations change very rarely, but their values can be specified by a user in the metrics manifest. This manifest also contains conversion factors and thresholds for harmonizing units and defining operational boundaries, respectively.

As shown in tag manifest 800, the application hierarchy contains application components known as analytics processes. Each application can run one or more of these processes. For example, an application named "TurboExpander1" has three processes named "NetPower", "CycleEfficiency", and "PowerGuarantee", as shown in tag manifest 800 of FIG. 8. Each of these processes has its own set of calculations that depend on machine-specific tag values, as shown in metrics manifest 900 of FIG. 9. Each tag in tag manifest 800 has its owner process identifier and owner controller identifier. Additionally, since one tag can be used in many different analytics calculations, it can have multiple owner process identifiers.

The assembly object is provided with SQL scripts to operate upon the data. In at least one implementation, the SQL scripts may be implemented on SQL Server Management Studio, SQL Server reporting services, and C#. The parsing of the manifest may be developed in C# and could be integrated with the whole system as a Common Language Runtime (CLR) assembly. The application-specific assembly may be added to the SQL Server assemblies so it can be called by SQL functions to extract the list of tags from the tag manifest. The tag list helps the script send out the calls into the SQL database.

The system feeds the results of the metrics and interpolation into a graphical trending to help the user observe system efficiency for a specific period of time. With this graphical trend data, the user can make important business decisions without entering into complex data analysis or statistical calculations. The user can make certain selections on the application dashboards to activate the assemblies upon demand, leveraging the properties of the SaaS-oriented architecture implementation. Beneficially, by displaying graphical results, the system described herein provides the user with global access to data and analytics and improved readability of the results, which may assist the user in the decision-making process, while hiding the complexity of the calculations.

Figure 10:
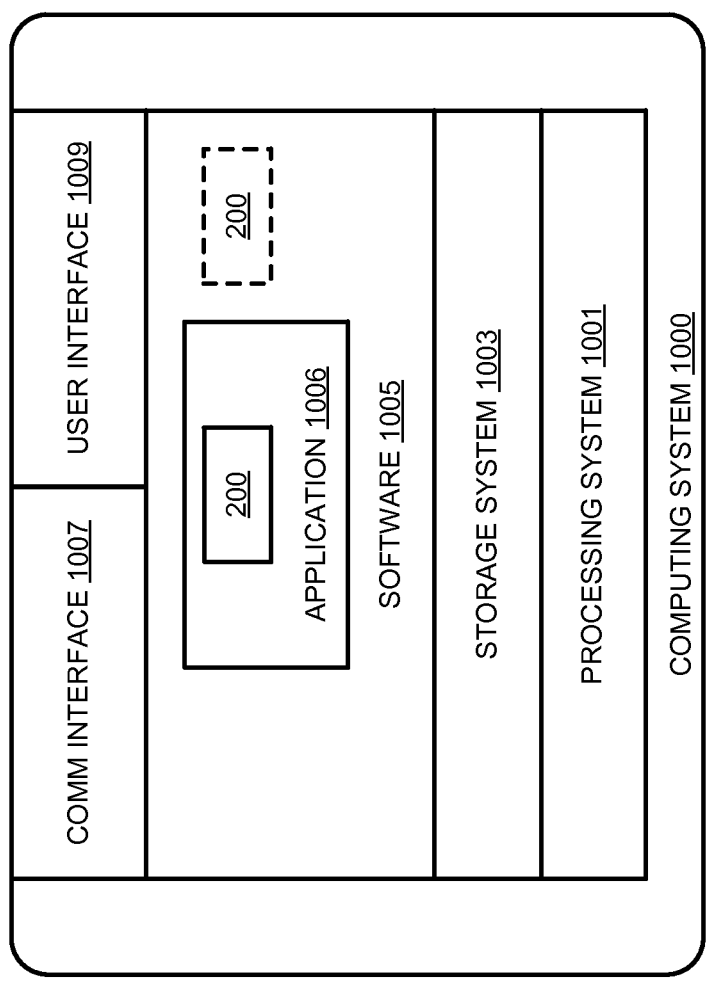
FIG. 10 illustrates a computing system in an exemplary implementation.

FIG. 10 illustrates computing system 1000 in an exemplary implementation. Computing system 1000 provides an example of computing system 100 or any system that may be used to facilitate simulating machines used in industrial automation, although other systems capable of performing the techniques disclosed herein could use alternative configurations. Computing system 1000 is representative of a computing system that may be employed in any computing apparatus, system, or device, or collections thereof. For example, computing system 1000 may be employed in server computers, cloud computing platforms, data centers, any physical or virtual computing machine, and any variation or combination thereof. In addition, computing system 1000 may be employed in desktop computers, laptop computers, tablets, smartphones, or the like.

Computing system 1000 includes processing system 1001, storage system 1003, software 1005, communication interface system 1007, and user interface system 1009. Processing system 1001 is operatively coupled with storage system 1003, communication interface system 1007, and user interface system 1009. Processing system 1001 loads and executes software 1005 from storage system 1003. Software 1005 includes application 1006 which itself includes analytics process 200. Analytics process 200 may optionally be implemented separately from application 1006. When executed by computing system 1000 in general, and processing system 1001 in particular, software 1005 directs computing system 1000 to operate as described herein for analytics process 200 or variations thereof. Computing system 1000 may optionally include additional devices, features, or functionality not discussed here for purposes of brevity.

Computing system 1000 may be representative of any computing apparatus, system, or systems on which application 1006 and analytics process 200 or variations thereof may be suitably implemented. Examples of computing system 1000 include mobile computing devices, such as cell phones, tablet computers, laptop computers, notebook computers, and gaming devices, as well as any other type of mobile computing devices and any combination or variation thereof. Note that the features and functionality of computing system 1000 may apply as well to desktop computers, server computers, and virtual machines, as well as any other type of computing system, variation, or combination thereof.

Referring still to FIG. 10, processing system 1001 may comprise a microprocessor and other circuitry that retrieves and executes software 1005 from storage system 1003. Processing system 1001 may be implemented within a single processing device but may also be distributed across multiple processing devices or sub-systems that cooperate in executing program instructions. Examples of processing system 1001 include general-purpose central processing units, application specific processors, and logic devices, as well as any other type of processing device, combinations, or variations thereof.

Storage system 1003 may comprise any non-transitory computer-readable media or storage media readable by processing system 1001 and capable of storing software 1005, such as a disk drive, flash drive, data storage circuitry, or some other hardware memory apparatus. In some examples, a computer apparatus could comprise storage system 1003 and operating software 1005. Storage system 1003 may include volatile and nonvolatile, removable and non-removable media implemented in any method or technology for storage of information, such as computer readable instructions, data structures, program modules, or other data. In addition to storage media, in some implementations storage system 1003 may also include communication media over which software 1005 may be communicated internally or externally. Storage system 1003 may be implemented as a single storage device but may also be implemented across multiple storage devices or sub-systems co-located or distributed relative to each other—including devices in different geographic areas. Storage system 1003 may also be embedded in various types of equipment. Storage system 1003 may comprise additional elements, such as a controller, capable of communicating with processing system 1001. Examples of storage media include random access memory, read only memory, magnetic disks, optical disks, flash memory, virtual memory and non-virtual memory, magnetic cassettes, magnetic tape, magnetic disk storage or other magnetic storage devices, or any other medium which can be used to store the desired information and that may be accessed by an instruction execution system, as well as any combination or variation thereof, or any other type of storage media. In no case is the storage media a propagated signal.

In operation, processing system 1001 loads and executes portions of software 1005, such as analytics process 200, in order to operate as described herein. In particular, software 1005 may be implemented in program instructions and among other functions may, when executed by computing system 1000 in general or processing system 1001 in particular, direct computing system 1000 or processing system 1001 to store, in a local cache, operational data generated by at least one industrial machine, and transfer the operational data for storage in an unstructured data storage system in a cloud-based architecture. Software 1005 may further direct computing system 1000 or processing system 1001 to, in the cloud-based architecture, process the operational data to convert the operational data to a structured format and store the operational data in the structured format in a structured data storage system. Software 1005 may further direct computing system 1000 or processing system 1001 to receive a request for analytics, and in response, extract at least a portion of the operational data from the structured data storage system and execute the analytics on the at least the portion of the operational data.

Software 1005 may include additional processes, programs, or components, such as operating system software or other application software. Examples of operating systems include Windows®, Linux, iOS®, and Android®, as well as any other suitable operating system. Software 1005 may also comprise firmware or some other form of machine-readable processing instructions executable by processing system 1001.

In general, software 1005 may, when loaded into processing system 1001 and executed, transform computing system 1000 overall from a general-purpose computing system into a special-purpose computing system customized to facilitate simulating machines used in industrial automation as described herein for each implementation. Software 1005 may also transform the physical structure of storage system 1003. The specific transformation of the physical structure may depend on various factors in different implementations of this description. Examples of such factors may include, but are not limited to, the technology used to implement the storage media of storage system 1003, whether the computer-storage media are characterized as primary or secondary storage, and the like. For example, if the computer-storage media are implemented as semiconductor-based memory, software 1005 may transform the physical state of the semiconductor memory when the software is encoded therein. For example, software 1005 may transform the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate this discussion.

Communication interface system 1007 may include communication connections and devices that allow for communication with other computing systems (not shown) over a communication network or collection of networks (not shown). Examples of connections and devices that together allow for inter-system communication may include network interface cards, antennas, power amplifiers, RF circuitry, transceivers, and other communication circuitry. The connections and devices may communicate over communication media to exchange communications with other computing systems or networks of systems, such as metal, glass, air, or any other suitable communication media. The aforementioned communication media, network, connections, and devices are well known and need not be discussed at length here.

User interface system 1009, which is optional, may include a mouse, a voice input device, a touch input device for receiving a touch gesture from a user, a motion input device for detecting non-touch gestures and other motions by a user, and other comparable input devices and associated processing elements capable of receiving user input from a user. Output devices such as a display, speakers, haptic devices, and other types of output devices may also be included in user interface system 1009. In some cases, the input and output devices may be combined in a single device, such as a display capable of displaying images and receiving touch gestures. The aforementioned user input and output devices are well known in the art and need not be discussed at length here. User interface system 1009 may also include associated user interface software executable by processing system 1001 in support of the various user input and output devices discussed above. Separately or in conjunction with each other and other hardware and software elements, the user interface software and devices may support a graphical user interface, a natural user interface, or any other suitable type of user interface.

The functional block diagrams, operational sequences, and flow diagrams provided in the Figures are representative of exemplary architectures, environments, and methodologies for performing novel aspects of the disclosure. While, for purposes of simplicity of explanation, methods included herein may be in the form of a functional diagram, operational sequence, or flow diagram, and may be described as a series of acts, it is to be understood and appreciated that the methods are not limited by the order of acts, as some acts may, in accordance therewith, occur in a different order and/or concurrently with other acts from that shown and described herein. For example, those skilled in the art will understand and appreciate that a method could alternatively be represented as a series of interrelated states or events, such as in a state diagram. Moreover, not all acts illustrated in a methodology may be required for a novel implementation.

The above description and associated drawings teach the best mode of the invention. The following claims specify the scope of the invention. Some aspects of the best mode may not fall within the scope of the invention as specified by the claims. Also, while the preceding discussion describes embodiments employed specifically in conjunction with the monitoring and analysis of industrial processes, other applications, such as the mathematical modeling or monitoring of any man-made or naturally-existing system, may benefit from use of the concepts discussed above. Further, those skilled in the art will appreciate that the features described above can be combined in various ways to form multiple variations of the invention. As a result, the invention is not limited to the specific embodiments described above, but only by the following claims and their equivalents.

Analytics Orchestrator

The following description and references to FIGS. 11 through 15 provide an exemplary implementation that incorporates an analytics orchestrator to integrate several different cloud service providers when performing cloud-based data storage, processing, and analytics. The analytics orchestrator is designed to be scalable, flexible, and capable of allowing any user to interface with the analytics framework.

In industrial automation operations, the data collected from machines, sensors, and real-time industrial applications continuously grows at fast rates, leading to torrential volumes of data. As data grows, the physical infrastructure and computing capabilities required to maintain the data scales up, which in turn keeps increasing the cost to maintain the data. This data may be utilized to enhance business and operations intelligence and solve domain-specific problems. Thus, adopting cloud computing technology in the industrial automation domain helps provide lower costs, higher computing capabilities, and very large storage capacities.

A framework that interfaces with intelligent agents and cloud services to perform complex analytics on data collected from on-premise applications will now be described. In order to analyze and process the vast amount of data, the data from industrial automation premises may be collected, serialized, encrypted and compressed into a suitable format for storage in the cloud. Each parameter in the system, called a tag, is associated with a time stamp to form time series data. Once in the cloud, a user is able to monitor the data from any location where a data connection to the cloud is available, thereby enabling remote monitoring of industrial applications.

In order to perform analytics on this data stored in the cloud, a robust infrastructure may be utilized to enable a user to develop domain-specific analytics to enhance business and operations intelligence. This infrastructure, referred to herein as the analytics orchestrator, provides several functions, including the flexibility to enable any user to build customized domain-specific applications using this infrastructure. The infrastructure can also scale out the analytics vertically across various applications and horizontally across multiple sites, plants, or other premises. The framework provides the ability to support multi-tenancy so that multiple clients can operate in parallel, while providing a secure operating environment for each client. The analytics orchestrator also provides a common interface to interact with on-premise agents and various cloud providers, ensures timely responses, and handles error conditions.

Figure 11:
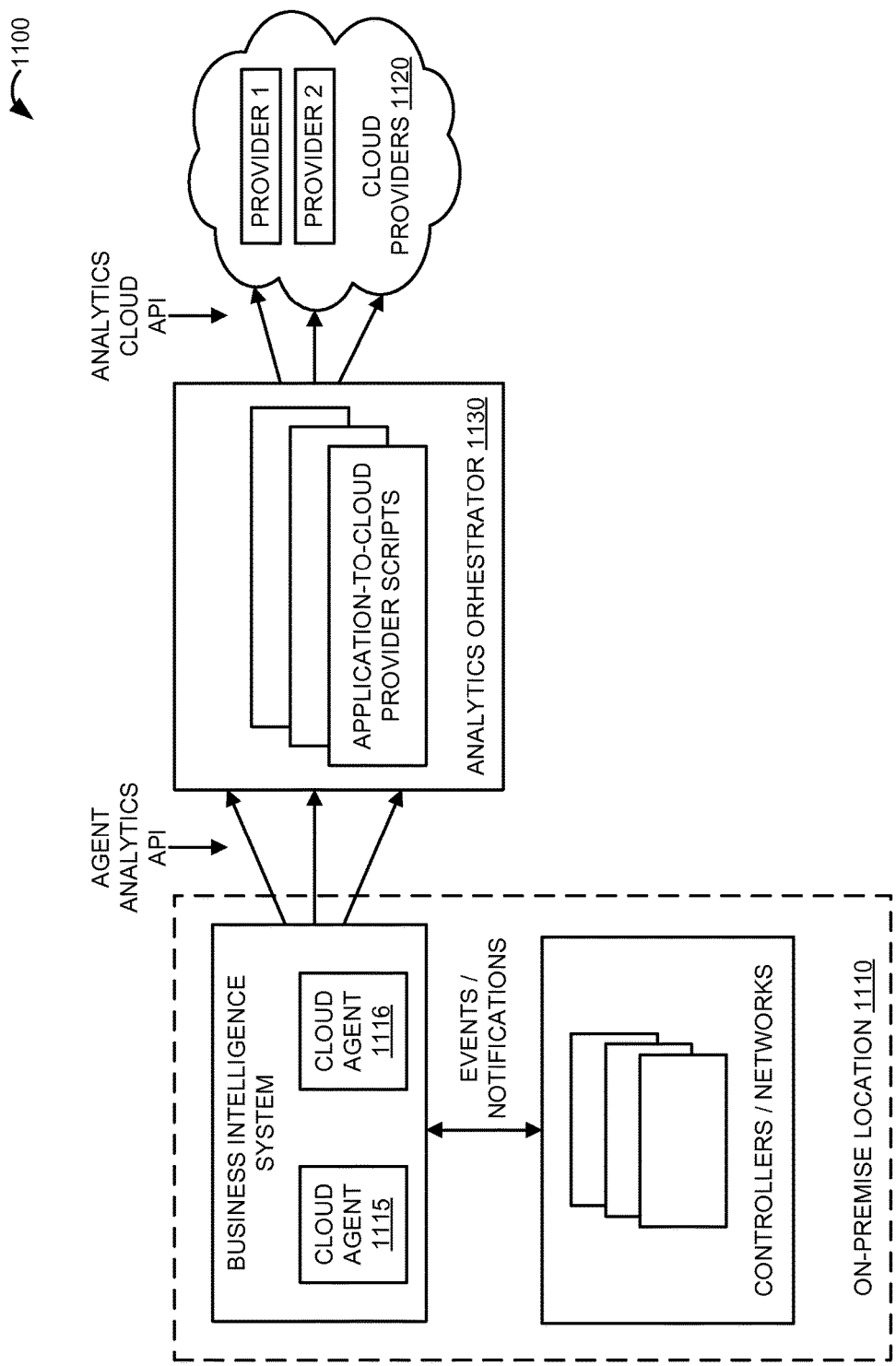
FIG. 11 illustrates a computing system and architectural framework that may be used to facilitate cloud-based data processing and analysis in an exemplary implementation.

FIG. 11 illustrates a computing system 1100 and architectural framework that may be used to facilitate cloud-based data processing and analysis in an exemplary implementation. Computing system 1100 includes on-premise location 1110, cloud providers 1120, and analytics orchestrator 1130. On-premise location 1110 includes various industrial controller systems which may be in communication with a business intelligence system over communication networks. As shown in FIG. 11, the business intelligence system includes several cloud agents 1115 and 1116.

In at least one implementation, the analytics orchestrator 1130 comprises an intelligent router that routes requests from the agents 1115 and 1116 to the cloud analytics services. The communication between agents 1115 and 1116 and analytics orchestrator 1130 and analytics orchestrator 1130 and the cloud 1120 are based on contracts. The agents 1115 and 1116 are generally on the premises 1110 and interact directly with the controllers that control the application. In some examples, the analytics orchestrator 1130 can be located on the premises 1110, in the cloud 1120, or any other location. The analytics orchestrator 1130 communicates with cloud analytics through a web service interface. In at least one implementation, the agents 1115 and 1116 and the analytics orchestrator 1130 may be run on different virtual machines and can communicate using socket communication.

Cloud agents 1115 and 1116 are intelligent modules that take decisions that require high computing power within reasonable time constraints. Each agent 1115 and 1116 is assigned with at least one capability, and each capability can comprise multiple operations. All capabilities are registered with a directory service. When an event occurs at the application level, the agents 1115 and 1116 will analyze the request and whichever has the ability to handle the event will generate a request to be sent to the analytics orchestrator 1130. For example, a controller may request enthalpy values during a particular interval of time, which could be accomplished by sending event notifications using Common Industrial Protocol (CIP) messages in some implementations. The appropriate cloud agent 1115 and/or 1116 will respond by generating a request for the analytics orchestrator 1130 based on a predefined contract between the agents 1115 and 1116 and the analytics orchestrator 1130. Based on the contract, the agents 1115 and 1116 will include all the information required by the analytics orchestrator 1130 to route the request to the specified analytics provider. The agents 1115 and 1116 then wait for a response from the analytics orchestrator 1130.

The analytics orchestrator 1130 listens for incoming requests from the agents 1115 and 1116. When a request is received, the analytics orchestrator 1130 determines if the request is a new request or if a thread has already been created for the request. The request is discarded if it is an existing request. If the request is a new request, analytics orchestrator 1130 creates a new thread to handle the request. The analytics orchestrator 1130 then parses the request to extract the request information and routes the request to the appropriate analytics script that can process the request.

Figure 12:
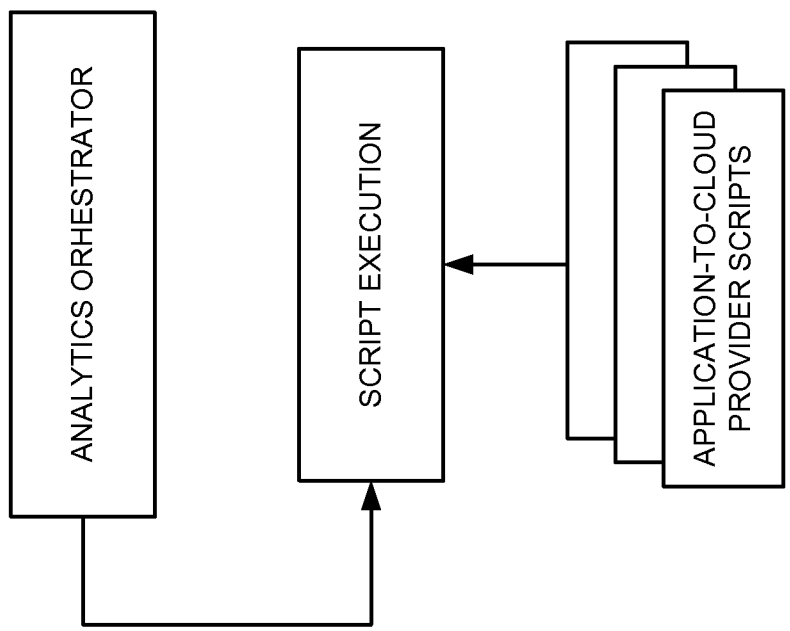
FIG. 12 illustrates a script structure supported by an analytics orchestrator in an exemplary implementation.

The analytics orchestrator 1130 supports a mix of heterogeneous scripts, such as Pig Latin, JavaScript, and the like, to handle requests to various cloud analytics providers. FIG. 12 shows a script structure supported by an analytics orchestrator 1130 in an exemplary implementation. As shown in FIG. 12, each application-to-cloud script inherits from the Script Execution script bank and defines the methods to initialize the parameters and to execute various analytics. A user may specify what analytics should be performed on the data, along with various coefficients, thresholds, and other information needed to process the request. The analytics orchestrator 1130 then generates and transfers the request for delivery to the cloud analytics provider specified by user. In some examples, the request may be created based on a contract between the analytics orchestrator 1130 and the cloud provider 1120. The request may then be sent to the web service client interface that invokes the requested cloud analytics service.

The cloud analytics scripts are deployed as web services and can be invoked by the client web service interface. The client web service interface connects to the requested web service by invoking the Uniform Resource Identifier (URI)

of the web service which is specified by the user. The communication is synchronous blocked, meaning that the requesting thread is blocked until it receives a response from the cloud analytics web service.

Due to the high end computing capabilities required for performing such a large scale of analytics, the cloud analytics capabilities are leveraged in this architecture. Cloud providers 1320 typically use technologies such as MapReduce to perform analytics on Big Data. There are also typically service level agreements that define the rules and regulations of the communication between the cloud providers 1320 and an external user. In this implementation, once a cloud provider 1320 receives a request, it analyzes the request and invokes the analytics script that will execute analytics and retrieve the requested information. The response is then packed into a pre-defined response format and sent back to the analytics script that issued the request. If any error conditions occur, the error conditions are also specified along with the response.

A programming model that may be used to develop any type of application using the infrastructure described above can be employed in three phases: (1) the design and programming phase, (2) the runtime phase, and (3) the offline processing phase.

Figure 13:
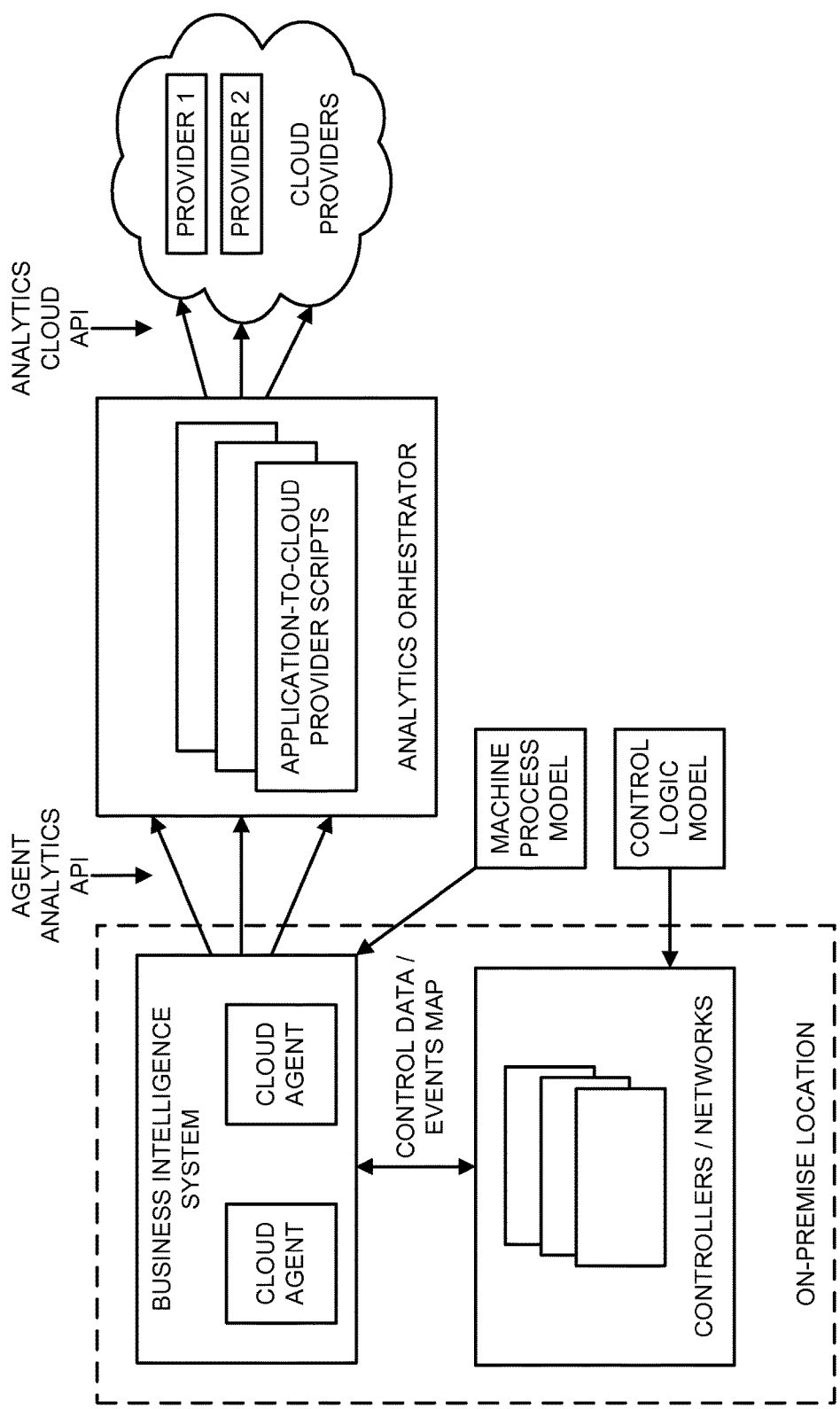
FIG. 13 illustrates a design and programming phase to facilitate cloud-based data processing in an exemplary implementation.

FIG. 13 illustrates a design and programming phase to facilitate cloud-based data processing in an exemplary implementation. In the design and programming phase, a user can design and develop models and scripts for execution during the runtime phase. As shown in FIG. 13, an application control logic model is provided to the controllers to define their control instructions, and the machine process model is provided to the agents for executing the business intelligence logic. The user may also develop domain-specific analytics for execution. For example, the user can develop analytics scripts to generate reports and trends, proactively control applications, or develop any intelligent applications on top of the analytics orchestrator infrastructure. The user can also define the contracts for communication between the agents and the analytics orchestrator and between the analytics orchestrator and the various cloud providers.

Figure 14:
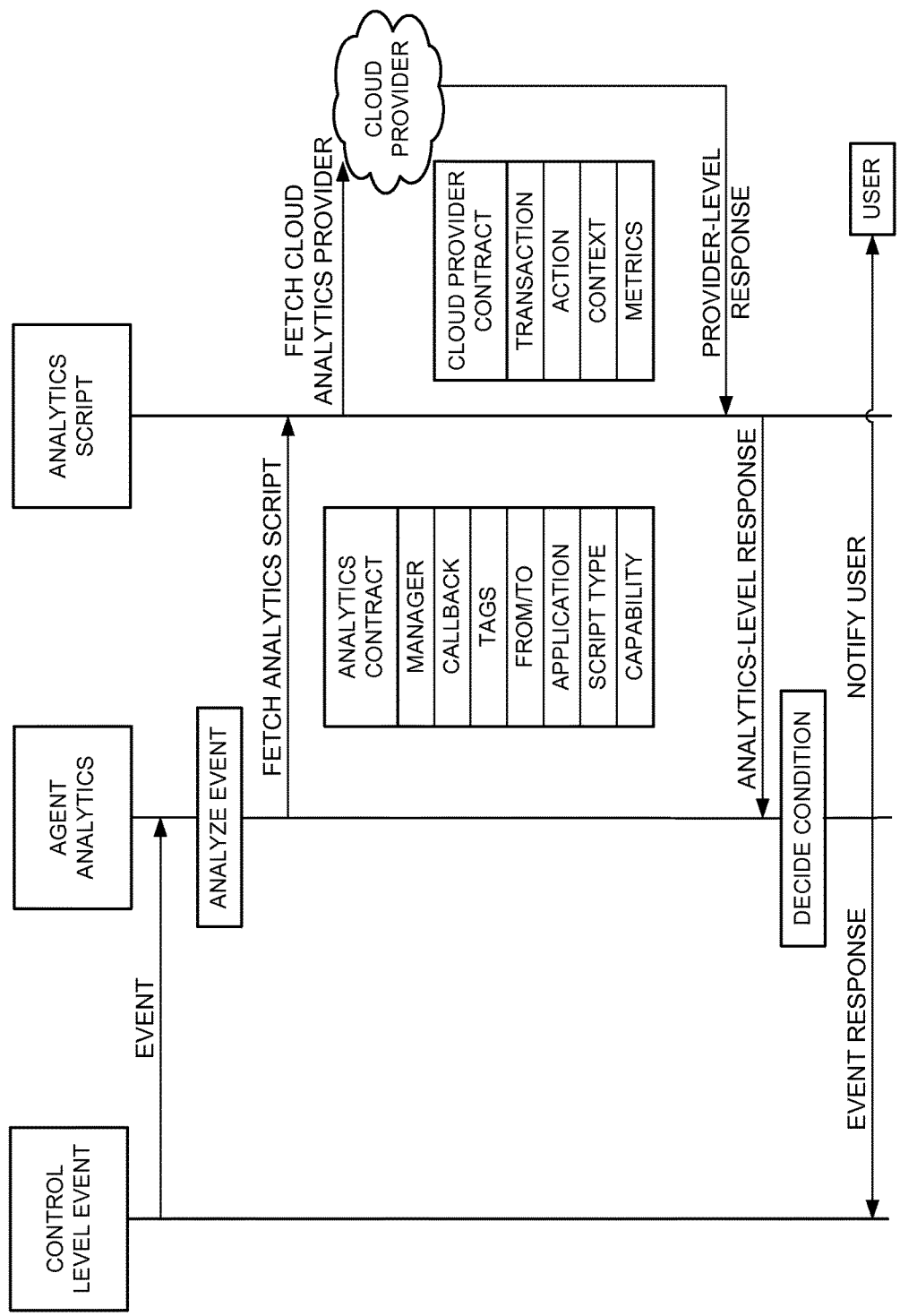
FIG. 14 illustrates a runtime phase to facilitate cloud-based data processing in an exemplary implementation.

FIG. 14 illustrates a runtime phase to facilitate cloud-based data processing in an exemplary implementation. The sequence of events that occur during the runtime phase are as described in FIG. 14. During runtime, an application is running on the premises and generates event notifications to the agents. Based on the business intelligence rules, the agents generate requests to the analytics orchestrator. In response to the requests, the analytics orchestrator executes the specified analytics script that was designed by the user and generates requests to the cloud analytics provider. The cloud analytics provider performs the required analytics and responds back to the analytics orchestrator with the requested data. The analytics orchestrator analyzes the response and performs the required analytics as described by the user in the design phase. The analytics orchestrator then sends the complete response back to the agent that triggered the request. The agents will make a decision based on the received response and convey the decision to the controller and to the user through notifications.

During runtime, anomalies may occur that were not anticipated. In the offline processing phase, the user can analyze these anomalies by extracting parameter characteristics from Big Data for intervals of time surrounding the occurrence of the anomaly. In some examples, the parameter characteristics can be analyzed using cloud computing technologies like MapReduce. Once the reason for the anomaly is discovered, new business intelligence rules can be programmed into the analytics scripts that will proactively handle future occurrences of the particular behavior. Beneficially, this provides a self-learning system that can continuously adopt new business rules without affecting the basic infrastructure of the system.

Figure 15:
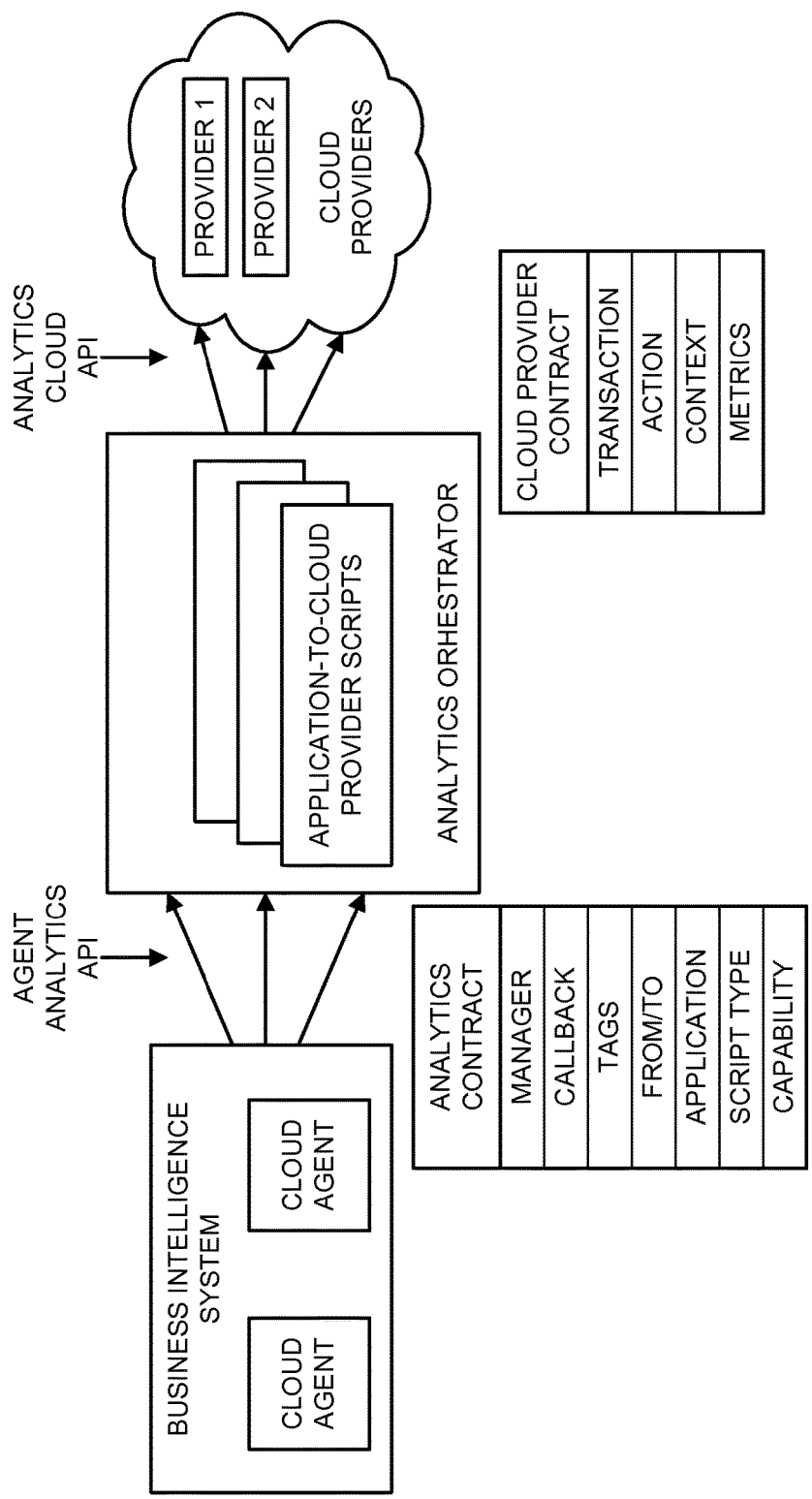
FIG. 15 illustrates an application programming interface contract specification in an exemplary implementation.

The interface between agents and the analytics orchestrator and the analytics orchestrator and a cloud provider can be established by means of contracts. The contract may specify the information that should be provided by each entity when generating a request or response. An example of a contract specification is shown in FIG. 15. The contract specifications shown in FIG. 15 are provided for two different application programming interfaces (APIs): an agent-analytics API and an analytics-cloud API. The elements in the contract between agents and the analytics orchestrator for the agent-analytics API are as follows:

Manager identifies the tenant.
Callback specifies the method to be invoked when a response is received.
Tags specify the parameters on which analytics is to be performed.
From/To indicates the time interval for extracting the data from Big Data storage.
Application specifies the particular application from which the event occurred.
Script-type specifies the analytics script group to be contacted. There is one analytics script group per cloud analytics provider. The analytics script group will prepare the requests to the cloud analytics provider according to the specifications of the particular cloud provider.
Capability represents the analytics to be performed, such as "calculate enthalpy" or the like.

The elements in the contract between the analytics orchestrator and a cloud analytics provider for the analytics-cloud API are as follows:

Transaction represents the timestamp of the transaction which is used in analytics to uniquely identify a transaction.
Action specifies the analytics to be performed by the cloud analytics provider.
Context specifies the information of the tenant which is used to locate the data of the tenant from the Big Data storage.
Metrics specify the tag values, time intervals, coefficients, thresholds, and other information needed to execute the requested analytics.

The elements described above for the agent-analytics API and the analytics-cloud API are just one example of contract elements that can be defined. The user can modify the details and parameters that are included in the contract without affecting the basic infrastructure. Advantageously, the APIs are defined in generic enough terms so that any client and any application can interact with any cloud provider, including multiple different cloud providers used by a single client.

The above description and associated drawings teach the best mode of the invention. The following claims specify the scope of the invention. Some aspects of the best mode may not fall within the scope of the invention as specified by the claims. Also, while the preceding discussion describes embodiments employed specifically in conjunction with the monitoring and analysis of industrial processes, other applications, such as the mathematical modeling or monitoring of any man-made or naturally-existing system, may benefit from use of the concepts discussed above. Further, those skilled in the art will appreciate that the features described above can be combined in various ways to form multiple variations of the invention. As a result, the invention is not limited to the specific embodiments described above, but only by the following claims and their equivalents.

What is claimed is:

1. A method to facilitate cloud-based data processing and analysis in an industrial automation environment, the method comprising:
in response to receiving a snapshot of operational data generated by at least one industrial machine from an on-premise agent in an industrial automation environment, storing the operational data in an unstructured format in an unstructured data storage system, wherein the operational data comprises data tags and each of the data tags is individually time stamped to form time-series data;
in response to storing the operational data, identifying a system manifest associated with the operational data;
identifying, from the system manifest, a data processing procedure for converting the operational data from the unstructured format to a structured format;
processing the operational data according to the identified procedure to convert the operational data to the structured format and storing the operational data in the structured format, along with a tag manifest that indicates analytics operations to perform on the operational data;
receiving a request for analytics that specifies at least a time interval for performing the analytics; and
in response to receiving the request:
identifying relevant tags from the tag manifest;
extracting, from the operational data in the structured format, at least a portion of the operational data that is associated with the time interval and the relevant tags;
identifying a metrics manifest associated with the one of the analytics operations; and
executing the analytics operations on the at least the portion of the operational data using the metrics manifest over the time interval.

2. The method of claim 1 comprising storing the operational data generated by at least one industrial machine in a local cache and transferring the operational data to the unstructured data storage system in the form of snapshots via the on-premise agent.

3. The method of claim 1 wherein the request for the analytics comprises a priority.

4. The method of claim 3 wherein executing the analytics on the at least the portion of the operational data comprises processing the request for the analytics based on the priority using a priority queue.

5. The method of claim 1 wherein transferring the operational data for storage in the unstructured data storage system in the cloud-based architecture comprises assigning a priority to the operational data.

6. The method of claim 5 wherein assigning the priority to the operational data comprises assigning the priority to the data tags of the operational data.

7. The method of claim 5 wherein processing the operational data to convert the operational data to the structured format and storing the operational data in the structured format comprises processing the operational data based on the priority.

8. An article of manufacture to operate a computing system to facilitate cloud-based data processing and analysis in an industrial automation environment, the article of manufacture comprising:
software instructions configured, when executed by the computing system, to direct the computing system to store operational data generated by at least one industrial machine in an unstructured format in an unstructured data storage system in response to receiving a snapshot of the operational data from an on-premise agent in an industrial automation environment, wherein the operational data comprises data tags and each of the data tags is individually time stamped to form time-series data;
the software instructions further configured to direct the computing system to:
in response to storing the operational data, identify a system manifest associated with the operational data;
identify, from the system manifest, a data processing procedure for converting the operational data from the unstructured format to a structured format;
process the operational data according to the identified procedure to convert the operational data to the structured format;
store the operational data in the structured format, along with a tag manifest that indicates analytics operations to perform on the operational data;
receive a request for analytics that specifies at least a time interval for performing the analytics; and
in response to receiving the request:
identify relevant tags from the tag manifest;
extract, from the operational data in the structured format, at least a portion of the operational data that is associated with the time interval and the relevant tags;
identify a metrics manifest associated with the one of the analytics operations; and
execute the analytics operations on the at least the portion of the operational data using the metrics manifest over the time interval; and
at least one non-transitory computer-readable storage medium storing the software instructions.

9. The article of manufacture of claim 8 wherein the operational data generated by at least one industrial machine is stored in a local cache and transferred for storage in the unstructured data storage system by the on-premise agent in the form of snapshots.

10. The article of manufacture of claim 8 wherein the request for the analytics comprises a priority.

11. The article of manufacture of claim 10 wherein the software instructions configured to direct the computing system to execute the analytics on the at least the portion of the operational data comprises the software instructions configured to direct the computing system to process the request for the analytics based on the priority using a priority queue in the cloud based architecture.

12. The article of manufacture of claim 9 wherein the operational data stored in the local cache and transferred for storage in the unstructured data storage system has been assigned a priority.

13. The article of manufacture of claim 12 wherein the data tags of the operational data stored in the local cache and transferred for storage in the unstructured data storage system have been assigned the priority.

14. One or more computer-readable storage media comprising program instructions stored thereon to facilitate cloud-based storage, processing and analysis of operational data in an industrial automation environment, wherein the program instructions, when executed by a computing system, direct the computing system to at least:

in response to receiving a snapshot of operational data generated by at least one industrial machine from an on-premise agent in an industrial automation environment, store the operational data in an unstructured format in an unstructured data storage system, wherein the operational data comprises data tags and each of the data tags is individually time stamped to form time-series data;

in response to storing the operational data, identify a system manifest associated with the operational data;

identify, from the system manifest, a data processing procedure for converting the operational data from the unstructured format to a structured format;

process the operational data according to the identified procedure to convert the operational data to the structured format and store the operational data in the structured format, along with a tag manifest that indicates analytics operations to perform on the operational data;

receive a request for analytics that specifies at least a time interval for performing the analytics; and in response to receiving the request:
    identify relevant tags from the tag manifest;
    extract, from the operational data in the structured format, at least a portion of the operational data that is associated with time interval and the relevant tags;
    identify a metrics manifest associated with the one of the analytics operations; and
    execute the analytics operations on the at least the portion of the operational data using the metrics manifest over the time interval.

15. The one or more computer-readable storage media of claim 14 wherein the operational data generated by at least one industrial machine is stored in a local cache and transferred to the unstructured data storage system by the on-premise agent in the form of snapshots.

16. The one or more computer-readable storage media of claim 14 wherein the request for the analytics comprises a priority.

17. The one or more computer-readable storage media of claim 16 wherein, to execute the analytics on the at least the portion of the operational data, the program instructions direct the computing system to process the request for the analytics based on the priority using a priority queue.

18. The one or more computer-readable storage media of claim 14 wherein, to transfer the operational data for storage in the unstructured data storage system, the program instructions direct the computing system to assign a priority to the operational data.

19. The one or more computer-readable storage media of claim 18 wherein, to assign the priority to the operational data, the program instructions direct the computing system to assign the priority to the data tags of the operational data.

20. The one or more computer-readable storage media of claim 18 wherein, to process the operational data to convert the operational data to the structured format and store the operational data in the structured format in the, the program instructions direct the computing system to process the operational data based on the priority.

* * * * *